United States Patent [19]

Decker, Jr.

[11] Patent Number: 4,557,556

[45] Date of Patent: Dec. 10, 1985

[54] METHOD OF FABRICATING AN OPTICAL ATTENUATOR BY FUSION SPLICING OF OPTICAL FIBERS

[75] Inventor: George A. Decker, Jr., Highlands, N.J.

[73] Assignee: AT&T Bell Laboratories, Murray Hill, N.J.

[21] Appl. No.: 546,734

[22] Filed: Oct. 28, 1983

[51] Int. Cl.$^4$ .............................................. G02B 5/14
[52] U.S. Cl. ............................ 350/96.21; 350/96.10; 350/96.15; 350/96.20; 65/4.1; 65/4.2; 65/4.21
[58] Field of Search .............. 350/96.10, 96.15, 96.20, 350/96.21, 96.22; 250/227; 65/4.1, 4.2, 4.21

[56] References Cited

U.S. PATENT DOCUMENTS

| | | | |
|---|---|---|---|
| 3,825,319 | 7/1974 | Cook | 350/96.15 |
| 3,960,531 | 6/1976 | Kohanzadeh et al. | 350/96.21 |
| 4,049,414 | 9/1977 | Smith | 350/96.21 |
| 4,261,640 | 4/1981 | Stankos | 350/96.15 |
| 4,313,744 | 2/1982 | Toda | 350/96.21 |

FOREIGN PATENT DOCUMENTS

| | | | |
|---|---|---|---|
| 52-68246 | 6/1977 | Japan | 350/96.21 |
| 53-71844 | 6/1978 | Japan | 350/96.21 |
| 53-108452 | 9/1978 | Japan | 350/96.21 |
| 54-2143 | 1/1979 | Japan | 350/96.15 |
| 54-34250 | 3/1979 | Japan | 350/96.21 |
| 55-79402 | 6/1980 | Japan | 350/96.21 |
| 55-95918 | 7/1980 | Japan | 350/96.21 |
| 55-76315 | 9/1980 | Japan | 350/96.21 |
| 56-59213 | 5/1981 | Japan | 350/96.21 |

OTHER PUBLICATIONS

Hatakeyama et al., "Fusion Splices for Single-Mode Optical Fibers", IEEE J. of Quant. Elect., vol. QE-14, No. 8, 8/78, pp. 614–619.

Hatakeyama et al., "Fusion Splices for Optical Fibers by Discharge Heating", Applied Optics, vol. 17, No. 12, 6/78, pp. 1959–1964.

J. F. Dalgleish, "Splices, Connectors, and Power Couplers for Field and Office Use", *Proc. of the IEEE*, vol. 68, No. 10, Oct. 1980, pp. 1226–1232.

D. L. Bisbee, "Splicing Silica Fibers with an Electric Arc", *Applied Optics*, vol. 15, No. 3, Mar. 1976, pp. 796–798.

*Primary Examiner*—William L. Sikes
*Assistant Examiner*—Brian M. Healy
*Attorney, Agent, or Firm*—Richard B. Havill

[57] ABSTRACT

An advantageous method for fabricating an optical attenuator between the ends of two optical fibers uses the following steps. The axes of the cores of optical fiber ends are misaligned by an offset distance and then one of them is moved along its center axis until the ends of the fibers abut one another. Abutted ends of the optical fibers are melted. While the fiber ends are molten, surface tension aligns the axes of the cores of the optical fibers. Finally the abutted ends region of the optical fibers is cooled into a lumped optical attenuator.

7 Claims, 6 Drawing Figures

METHOD OF FABRICATING AN OPTICAL ATTENUATOR BY FUSION SPLICING OF OPTICAL FIBERS

BACKGROUND OF THE INVENTION

This invention relates to a method for fabricating an optical attenuator by fusion splicing of optical fibers and more particularly by using surface tension that occurs during fusion to align the previously offset cores of the fibers.

In an undersea lightwave transmission system, it is desired to have the same optical loss in all fibers of the cable between each pair of repeaters. Because there likely is a different loss in each different fiber, an optical attenuator is inserted in line with the fiber as a lumped buildout loss in the low loss ones of the fibers.

In the prior art, optical attenuators are provided as separate piece parts which are inserted between the ends of two optical fibers by means of mechanical coupling devices. Inserting such an optical attenuator into a system adds not only the attenuator itself but also the mechanical coupling devices. It is well known that system reliability is reduced by any increase in the number of separate components, or devices, used in the system. Thus the insertion of the optical attenuator plus the coupling devices not only increases optical loss but also reduces system reliability.

For an undersea optical fiber transmission system requiring very high reliability, it is desirable to insert an optical attenuator between the ends of two optical fibers by using the lowest possible number of separate parts to retain high reliability while increasing optical loss. Thus there is a problem finding a way to insert an optical attenuator between the ends of two optical fibers without reducing reliability.

SUMMARY OF THE INVENTION

This problem is solved by employing an advantageous method for fabricating an optical attenuator between the ends of two optical fibers using the following steps. The axes of the cores of optical fiber ends are misaligned by an offset distance and then one of them is moved along its center axis until the ends of the fibers abut one another. The abutted ends of the optical fibers are melted. While the fiber ends are molten, surface tension partially or wholly aligns the axes of the cores of the optical fibers. Finally the abutted ends region of the optical fibers is cooled into a lumped optical attenuator.

BRIEF DESCRIPTION OF THE DRAWINGS

A better understanding of the invention may be gained from the following detailed description when it is read with reference to the drawings wherein.

DETAILED DESCRIPTION

Figure 1:
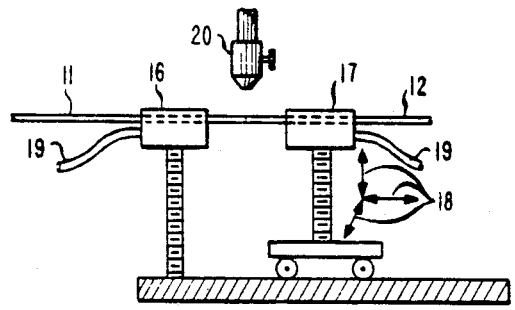
FIG. 1 is a schematic diagram of apparatus and optical fibers set up for initiating the disclosed method.

Referring now to FIG. 1, there is shown an arrangement for fabricating a fusion splice for attenuating optical signals being transmitted through an optical fiber transmission line. An optical fiber 11 has an end positioned next to an end of another optical fiber 12. For the purposes of the description, the fibers 11 and 12 are considered to be single mode optical fibers. The outside diameter of the cladding of the fibers is approximately 125 $\mu$m. A core section of each fiber has a diameter of approximately 8–10 $\mu$m.

The adjacent ends of the optical fibers 11 and 12 can couple light from one of the optical fibers to the other forming a continuous optical transmission line between a terminal and a repeater or between two repeaters, not shown, but connected with the other ends of the two optical fibers 11 and 12.

Along the optical fibers, distributed optical loss is imposed on any optical signal being transmitted through the fibers. By design choice, the distributed optical loss imposed by the optical fibers 11 and 12 is less than a predetermined desired value of optical loss between the terminal and repeater or between the two repeaters.

An advantageous method for imposing additional lumped optical loss into the fiber transmission line is described hereinafter. The additional lumped optical loss will equal the difference between the predetermined desired value of optical loss and the distributed optical loss imposed by the fibers. For the method of imposing the additional lumped optical loss, as described herein, it is not necessary to transmit any optical signal through the fibers for monitoring.

The end of the optical fiber 11 is constrained by a fixed clamping device 16 while the end of the optical fiber 12 is held by a movable clamping device 17. A micromanipulator arrangement with three degrees of freedom is used for the movable clamping device 17. The three degrees of freedom are shown illustratively as double-ended arrows 18 which are positioned on mutually perpendicular axes.

To initiate the method, the ends of the fibers are put in place and are held down in the clamping devices 16 and 17 by a vacuum. A vacuum line 19 evacuates air from the bottoms of V-grooves in the clamping devices 16 and 17. While viewing the end regions of the fibers through a microscope 20, the micromanipulator is adjusted until the axes of the cores of the fibers are in line with each other. Correct axial alignment of the cores of the fibers is determined only by microscopic inspection. Two mutually perpendicular microscopic views of the ends of the fibers are used. Such mutually perpendicular views are facilitated by positioning a mirror surface below the ends of the fibers to reflect light back to the microscope. As previously mentioned, no optical signal needs to be transmitted through the fibers to help align the cores.

Figure 2:
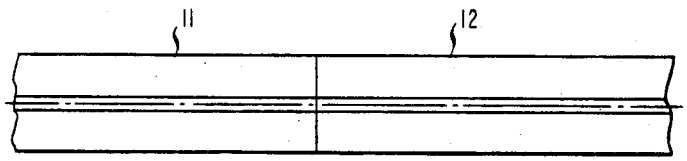
FIG. 2 is a sectional view along the center line of the ends of a pair of optical fibers set up for initiating the disclosed method.

FIG. 2 shows the ends of the fibers 11 and 12 positioned adjacent to each other with the center lines of their cores aligned axially. Once the axes of the cores are so aligned, the center line of the core of the end of the optical fiber 12 is moved transversally. This transversal movement of the end of the optical fiber 12 is accomplished by manually moving the micromanipulator in one of its degrees of freedom while holding the other two degrees of freedom in place.

Figure 3:
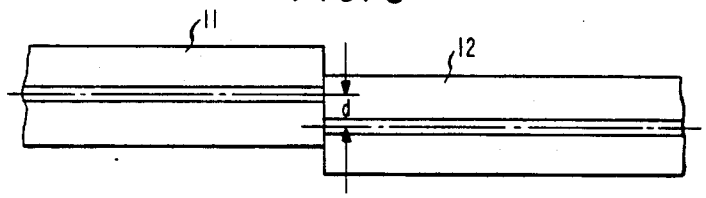
FIG. 3 is a sectional view along the center line of the ends of a pair of optical fibers having the center lines of their cores offset from one another during the performance of the disclosed method.

Referring now to FIG. 3, the center line of the core of the fiber 12 is held parallel with but is offset by a distance d from the center line of the core of the fiber 11. Useful offset distances d fall in a range between 5 $\mu$m and 60 $\mu$m. For single mode fibers having a cladding diameter of 125 $\mu$m and a core diameter of 9 $\mu$m, the range of offset distances d is between one-half of the diameter of the core and one-half of the diameter of the cladding of the fibers. A preferred offset distance d equals approximately 50 $\mu$m or two-fifths of the diameter of the cladding of the fibers. FIG. 3 shows the abutting regions of the ends of the fibers 11 and 12 when the axes of the cores are parallel with one another, but separated by the offset distance d.

Figure 4:
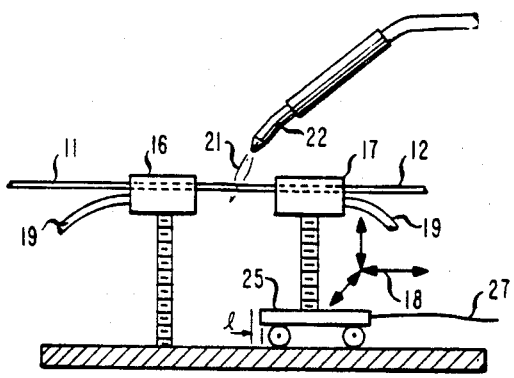
FIG. 4 is a schematic diagram of apparatus and optical fibers for performing the disclosed method.

Referring now to FIG. 4, there is shown the ends of the fibers 11 and 12 positioned with their core axes parallel to each other and offset by the distance d. With the fiber ends so positioned, a computerized control arrangement moves the end of the fiber 12 along its center line a predetermined stroke length l in a range of 2 $\mu$m to 100 $\mu$m. The computerized control arrangement includes a motorized carriage 25 which receives control signals from a computer source by way of control leads 27. A program in the computer instructs the carriage motor to move the carriage 25 through the predetermined stroke length l along the center line of the core of the fiber 12. For the previously mentioned single mode fibers, a stroke length of approximately 4 $\mu$m is preferred.

As shown in FIG. 4, a flame 21 from a chlorine mantled oxyhydrogen torch 22 heats the end regions of the fibers 11 and 12 until they melt and fuse together. J. T. Krause et al disclose a suitable procedure in a U.S. patent application, Ser. No. 300,108, filed Sept. 8, 1981, now abandoned. Preferably approximately 0.35 liters/minute hydrogen gas is delivered to the torch for burning. A surrounding mantle of chlorine gas is provided by a flow rate of approximately 0.05 liters/minute. Heating of the fibers is accomplished at the edge of the visible flame.

The previously mentioned computerized control arrangement also controls the position of the flame 21. Thus the torch 22 is moved so that the edge of the flame 21 impinges on the region of the fiber ends to initiate heating. The heating is continued for a predetermined period until fusion is complete. This period is referred to hereinafter as a dwell time t. At the end of the dwell time, the flame is moved away from the fibers. Excellent optical attenuators are produced using a dwell time t selected from a range of 10 seconds to 30 seconds. A high tensile strength will occur in the resulting optical attenuator when a dwell time of approximately 15 seconds is used.

There are some important parameters relating to the physical characteristics of the resulting fusion splice. Those parameters include the magnitude of the optical loss in the attenuator, the standard deviation of the magnitude of the optical losses measured in a group of similarly made attenuators, and the tensile strength of the resulting attenuators. Such parameters are controllable through changes of one or more of the controlling parameters, including the offset distance d, the stroke length l and the dwell time t.

The magnitude of the optical loss in the resulting optical attenuator depends more or less directly with the magnitude of the transverse offset distance d and indirectly with the dwell time t. Thus in general increasing the transverse offset distance d before the heating step increases the optical loss in the resulting attenuator. Also a short dwell time t produces a high optical loss while a longer dwell time t decreases the optical loss in the resulting attenuator.

The configuration and offset of the cores of the fibers in the resulting attenuator determine the magnitude of the optical loss.

Figure 5:
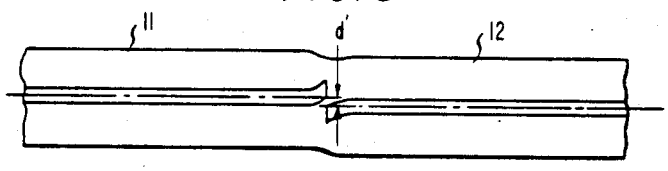
FIG. 5 is a sectional view along the center line of the ends of a pair of optical fibers spliced together forming an optical attenuator.

Referring now to FIG. 5, there is shown a cutaway view through the fusion region of one configuration of the resulting attenuator. This view discloses that during fusion, the ends of the fibers 11 and 12, having their center axes offset by the distance d just prior to fusion, are pulled closer into alignment during fusion. Surface tension, occurring in the fusion region while the fiber ends are molten, exerts forces that tend to align the surfaces of the fibers and that also tend to align the center axes of the cores. As a result of the pressing together of the fiber ends and a result of the surface tension, there is some reshaping of the ends of the cores. In general, however, the offset distance between center axes of the cores of the fibers 11 and 12 is reduced from the initial offset distance d to a final offset distance d'. A resulting attenuator having a configuration and offset of the cores as shown in FIG. 5 has a relatively high optical loss.

Figure 6:
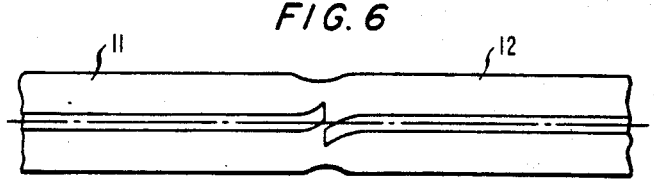
FIG. 6 is a sectional view along the center line of the ends of another pair of optical fibers spliced together forming another optical attenuator.

Turning next to FIG. 6, there is shown a cutaway view along the axes of the fibers 11 and 12 after they are fused under different conditions. This view is of an attenuator fabricated from starting conditions similar to those used when initiating the process of fabricating the attenuator of FIG. 5. In the process of fabricating the attenuator of FIG. 6, however, the dwell time t is longer than the dwell time t used for the attenuator of FIG. 5.

In FIG. 6 it is noted that both the surfaces of the cladding of the fibers 11 and 12 and the center axes of their cores are nearly aligned, i.e., the final offset distance d' is reduced to or is reduced near to zero. The ends of the cores of the fibers are reshaped much more than the ends of the cores in FIG. 5. A longer dwell time t allows the surface tension of the molten fibers to pull the center axes of the cores closer into alignment and to bend the ends of the cores. The more those cores near alignment with each other and the more the ends of the cores bend, the more the optical loss of the resulting attenuator decreases.

Some stroke length l is selected so that the resulting attenuator is sufficiently strong. Although the stroke length l has little effect on the optical loss, it does effect the tensile strength of the resulting attenuator. Shorter stroke lengths in a range of 2 $\mu$m to 10 $\mu$m consistently produce attenuators having a tensile strength equal to or greater than 300K psi. For many applications a stroke length l equal to 4 $\mu$m is preferable.

Initial offset distance d greatly influences the magnitude of the optical loss in the resulting attenuator. Although useful attenuators can be fabricated with an initial offset distance d in a range from 5 $\mu$m to 60 $\mu$m, it is apparent that using an initial offset distance from the high end of the range produces advantageous magnitudes of loss in the resulting attenuators.

Standard deviation of the magnitude of loss is kept desirably low for high loss attenuators by using an offset distance d equal to 50 μm, a stroke length l equal to 4 μm and a dwell time t equal to 15 seconds. Lower loss attenuators are fabricated using the same offset distance d and the same stroke length l but a longer dwell time, such as 30 seconds.

Following the heating and aligning of the cores of the fibers, the torch 22 is moved so that the flame 21 no longer impinges on the fusion region, as previously mentioned. Thus ends the dwell time t. Thereafter the fusion region cools into the resulting lumped optical attenuator.

Although it is an object to achieve reproducible loss in attenuators, it is noted again that no optical signal is transmitted through the fibers 11 and 12 for monitoring loss while the attenuator is being fabricated. The described method uses a statistical data base that shows results are acceptably reproducible. Even without monitoring the loss during fabrication, the magnitude of the resulting loss, the standard deviation of the magnitude of loss among a group of attenuators, and the tensile strength of the resulting attenuator are all well controlled. It is clear, however, that the value of loss also can be controlled by actively monitoring loss during the melting step.

The foregoing describes a method for fabricating an optical attenuator. The method described together with other similar methods made obvious in view thereof are considered to be within the scope of the invention.

What is claimed is:

1. A method for fabricating an optical attenuator comprising the steps of:
    offsetting the axes of the cores of a pair of optical fiber ends by an offset distance d in a range of twice the diameter of the core to one-half of the diameter of the cladding of the optical fibers;
    moving one of the offset optical fiber ends along its center axis until they abut one another;
    melting the abutted offset ends of the optical fibers into a splice;
    aligning the axes of the cores of the melted abutted ends of the optical fibers by way of surface tension; and
    cooling the abutted ends of the optical fibers into a lumped optical attenuator.

2. A method for fabricating an optical attenuator, in accordance with claim 1, wherein
    after abutting during the optical fiber end moving step, one fiber end is moved through a stroke length l within a range of 2 μm to 10 μm.

3. A method for fabricating an optical attenuator, in accordance with claim 1, wherein
    during the axes offsetting step, the axes of the cores are separated by an offset distance d equal to approximately two-fifths of the outside diameter of the cladding of the optical fiber ends.

4. A method for fabricating an optical attenuator, in accordance with claim 2, wherein
    after abutting during the optical fiber end moving step, one fiber end is moved through a stroke length l of approximately 4 μm.

5. A method for fabricating an optical attenuator, in accordance with claim 1, wherein
    the melting of the abutted ends and the aligning of the cores of the axes occur during a dwell time t in a range of 10 seconds to 30 seconds.

6. The method for fabricating an optical attenuator, in accordance with claim 5, wherein
    after abutting during the optical fiber end moving step, one fiber end is moved through a stroke length l within a range of 2 μm to 10 μm.

7. The method for fabricating an optical attenuator, in accordance with claim 5 wherein
    during the axes offsetting step, the axes of the cores are separated by an offset distance d equal to approximately two-fifths of the outside diameter of the cladding of the optical fiber ends; and
    after abutting during the optical fiber end moving step, one fiber end is moved through a stroke length l of approximately 4 μm.

* * * * *